(12) United States Patent
Arakawa et al.

(10) Patent No.: US 10,131,481 B2
(45) Date of Patent: Nov. 20, 2018

(54) OXYGEN ABSORBING MULTILAYER CONTAINER AND METHOD FOR PRODUCING THE SAME

(71) Applicant: MITSUBISHI GAS CHEMICAL COMPANY, INC., Tokyo (JP)

(72) Inventors: Shota Arakawa, Kanagawa (JP); Takashi Kashiba, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/127,515

(22) PCT Filed: Mar. 25, 2015

(86) PCT No.: PCT/JP2015/059050
§ 371 (c)(1),
(2) Date: Sep. 20, 2016

(87) PCT Pub. No.: WO2015/147031
PCT Pub. Date: Oct. 1, 2015

(65) Prior Publication Data
US 2017/0137203 A1   May 18, 2017

(30) Foreign Application Priority Data
Mar. 26, 2014 (JP) .................................. 2014-062918

(51) Int. Cl.
*B65D 81/26* (2006.01)
*B32B 27/08* (2006.01)
(Continued)

(52) U.S. Cl.
CPC .............. *B65D 81/266* (2013.01); *B32B 1/02* (2013.01); *B32B 7/02* (2013.01); *B32B 7/12* (2013.01); *B32B 27/08* (2013.01); *B32B 27/18* (2013.01); *B32B 27/325* (2013.01); *B32B 27/36* (2013.01); *B32B 37/00* (2013.01); *C08G 63/181* (2013.01); *C08K 5/098* (2013.01); *B32B 2250/05* (2013.01); *B32B 2250/24* (2013.01); *B32B 2250/40* (2013.01); *B32B 2264/105* (2013.01); *B32B 2307/30* (2013.01); *B32B 2307/306* (2013.01); *B32B 2307/412* (2013.01); *B32B 2307/558* (2013.01); *B32B 2307/702* (2013.01); *B32B 2307/7244* (2013.01); *B32B 2307/738* (2013.01); *B32B 2307/74* (2013.01); *B32B 2439/40* (2013.01); *B32B 2439/46* (2013.01); *B32B 2439/60* (2013.01); *B32B 2439/62* (2013.01); *B32B 2439/66* (2013.01);
(Continued)

(58) Field of Classification Search
CPC ........... B65D 81/266; B32B 1/02; B32B 7/12; B32B 7/02; B32B 37/00; B32B 27/325; B32B 27/08; B32B 27/36; B32B 27/18; B32B 2439/60; B32B 2439/46; B32B 2307/738; B32B 2307/74; B32B 2307/702; B32B 2250/24; B32B 2264/105; B32B 2307/306; B32B 2307/30; B32B 2250/40; B32B 2250/05; B32B 2439/66; B32B 2439/62; B32B 2439/80; B32B 2439/70; B32B 2439/40; B32B 2307/7244; B32B 2307/558; B32B 2307/41; C08G 63/181; C08K 5/098; C08K 2201/012
USPC ......... 428/141, 35.7, 1.31, 1.33, 221, 314.8, 428/316.6, 319.7, 36.6, 36.92, 457, 475.2, 428/480, 483, 516, 522, 532, 113, 131, 428/201, 206, 209, 215, 219, 315.5, 428/317.9, 318.4, 319.1, 327, 34.2, 34.4, 428/354, 35.8, 35.9, 36.3, 374, 389, 401, 428/407, 412, 472.3, 474.4, 476.9, 518, 428/536, 544, 63, 650
See application file for complete search history.

(56) References Cited

U.S. PATENT DOCUMENTS 3,505,282 A * 4/1970 Storms ................. C08G 63/181
528/180
6,544,610 B1 * 4/2003 Minami .................. B32B 27/08
428/35.7
(Continued)

FOREIGN PATENT DOCUMENTS

EP   2 695 594   2/2017
JP   7-224155    8/1995
(Continued)

OTHER PUBLICATIONS

PubChem (PubChem, National Center for Biotechnology Information. PubChem Compound Database; CID=11288106, https://pubchem.ncbi.nlm.nih.gov/compound/11288106, accessed Dec. 14, 2017).*

(Continued)

*Primary Examiner* — Gerard Higgins
*Assistant Examiner* — Kevin C Ortman, Jr.
(74) *Attorney, Agent, or Firm* — Greenblum & Bernstein, P.L.C.

(57) ABSTRACT

An oxygen absorbing multilayer container having at least three layers of a first resin layer containing a thermoplastic resin, an oxygen absorbing layer containing an oxygen absorbing resin composition which contains a polyester compound (a) containing a constituent unit having a tetralin ring and a transition metal catalyst, and a second resin layer containing the same type of thermoplastic resin as the thermoplastic resin contained in the first resin layer, in this order, in which a cycloolefin polymer having a glass transition temperature of 50 to 110° C. is contained as the thermoplastic resin.

7 Claims, No Drawings

(51) Int. Cl.
    *B32B 27/18*     (2006.01)
    *B32B 27/36*     (2006.01)
    *C08K 5/098*     (2006.01)
    *B32B 27/32*     (2006.01)
    *B32B 1/02*     (2006.01)
    *C08G 63/181*     (2006.01)
    *B32B 7/02*     (2006.01)
    *B32B 7/12*     (2006.01)
    *B32B 37/00*     (2006.01)

(52) U.S. Cl.
    CPC ....... *B32B 2439/70* (2013.01); *B32B 2439/80* (2013.01); *C08K 2201/012* (2013.01)

(56) References Cited

U.S. PATENT DOCUMENTS

| 2003/0012896 | A1* | 1/2003 | Ching | B32B 27/06 |
| | | | | 428/34.2 |
| 2005/0228122 | A1* | 10/2005 | Kannan | C07C 233/63 |
| | | | | 524/599 |
| 2014/0308405 | A1 | 10/2014 | Okada et al. | |
| 2015/0298887 | A1 | 10/2015 | Okada et al. | |
| 2015/0368022 | A1 | 12/2015 | Okada et al. | |

FOREIGN PATENT DOCUMENTS

| WO | 2013/077436 | 5/2013 |
| WO | 2013/089268 | 6/2013 |
| WO | 2014/136914 | 9/2014 |

OTHER PUBLICATIONS

Vlachopoulos (Vlachopoulos, John & Strutt, David, "The Role of Rheology in Polymer Extrusion," Extrusion Minitec and Conference: From Basics to Recent Developments, 2003, p. 1-25).*

"ZEON Begins Marketing ZEONEX © 5000 for Medical Packaging"; www.zeon.co.jp; Jan. 6, 2014; pp. 1-2.

Internatioanl Search Report issued in PCT/JP2015/059050, dated Jun. 30, 2015.

* cited by examiner

OXYGEN ABSORBING MULTILAYER CONTAINER AND METHOD FOR PRODUCING THE SAME

TECHNICAL FIELD

The present invention relates to an oxygen absorbing multilayer container and a method for producing the same.

BACKGROUND ART

Examples of articles which easily deteriorate or degrade under the influence of oxygen include foods, beverages, medicinal products and cosmetics. In order to prevent oxygen oxidation of such articles and store them for a long period of time, oxygen absorbers, which remove oxygen within packages storing these articles, are used.

In addition, a large number of oxygen absorbing containers, which are containers for storing these articles and to which oxygen absorption property is provided, have been proposed. Of them, as an oxygen absorbing container having excellent oxygen barrier performance and oxygen absorption performance in a wide range of humidity conditions from low humidity to high humidity, an oxygen absorbing multilayer container containing a polymer having a predetermined tetralin ring and a transition metal catalyst (see, Patent Literature 1) has been developed.

CITATION LIST

Patent Literature

Patent Literature 1: International Publication No. WO 2013/077436

SUMMARY OF INVENTION

Technical Problem

However, conventional oxygen absorbing multilayer containers described in e.g., Patent Literature 1 have a problem in that it is difficult to keep all of impact resistance, molding processability and transparency at high levels and in a balanced manner, by a combination of resins to be used in individual layers.

The present invention was made under the aforementioned circumstances and is directed to providing an oxygen absorbing multilayer container excellent in impact resistance, molding processability and transparency.

Solution to Problem

The present inventors have conducted intensive studies on oxygen absorbing multilayer containers. As a result, they found that the above problem can be overcome by an oxygen absorbing multilayer container having at least three layers of a first resin layer containing a thermoplastic resin (b), an oxygen absorbing layer containing an oxygen absorbing resin composition which contains a polyester compound (a) containing a constituent unit having a tetralin ring and a transition metal catalyst, and a second resin layer containing a thermoplastic resin (b), in this order, in which a cycloolefin polymer having a glass transition temperature of 50 to 110° C. is used as the thermoplastic resin (b). Based on the finding, the present invention was accomplished.

More specifically, the present invention is as follows.

<1>

An oxygen absorbing multilayer container comprising at least three layers of:

a first resin layer comprising a thermoplastic resin;

an oxygen absorbing layer comprising an oxygen absorbing resin composition which comprises a polyester compound (a) comprising a constituent unit having a tetralin ring and a transition metal catalyst; and a second resin layer comprising a same type of thermoplastic resin as the thermoplastic resin in the first resin layer, in this order, wherein the oxygen absorbing multilayer container comprises a cycloolefin polymer having a glass transition temperature of 50 to 110° C. as the thermoplastic resin.

<2>

The oxygen absorbing multilayer container according to [1] above, wherein a melt viscosity of the thermoplastic resin at a shear rate of 1216 sec$^{-1}$ and 260° C. is 100 to 300 Pa·sec.

<3>

The oxygen absorbing multilayer container according to [1] or [2] above, wherein an absolute value of difference in the melt viscosity at a shear rate of 1216 sec$^{-1}$ and 260° C. between the thermoplastic resin and the polyester compound (a) is 0 to 150 Pa·sec.

<4>

The oxygen absorbing multilayer container according to any one of [1] to [3] above, wherein the polyester compound (a) comprises a constituent unit represented by the following formula (1).

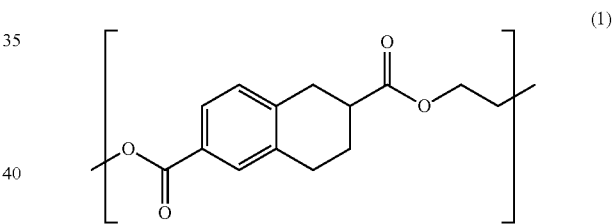

<5>

The oxygen absorbing multilayer container according to [4] above, wherein a proportion of the constituent unit represented by the above formula (1) based on all constituent units in the polyester compound (a) is 50 to 100 mol %.

<6>

The oxygen absorbing multilayer container according to any one of [1] to [5] above, wherein the transition metal catalyst comprises at least one transition metal selected from the group consisting of manganese, iron, cobalt, nickel and copper.

<7>

The oxygen absorbing multilayer container according to any one of [1] to [6] above, wherein an amount of the transition metal catalyst in terms of an amount of transition metal is 0.001 to 10 parts by mass based on 100 parts by mass of the polyester compound.

<8>

A method for producing the oxygen absorbing multilayer container according to any one of [1] to [7] above, comprising a step of forming a multilayer container by injecting at least three layers of the first layer, the oxygen absorbing layer and the second layer from an injection cylinder, wherein, in the step, the absolute value of difference between an injection cylinder temperature for the first layer and an injection cylinder temperature for the oxygen absorbing layer is 0 to 30° C.

Advantageous Effects of Invention

According to this invention, it is possible to provide an oxygen absorbing multilayer container excellent in impact resistance, molding processability and transparency. Furthermore, since the molding processability of the oxygen absorbing multilayer container is improved, it is possible to provide an oxygen absorbing multilayer container further excellent in appearance.

DESCRIPTION OF EMBODIMENTS

Now, an embodiment for carrying out the present invention (hereinafter referred to simply as "the present embodiment") will be described. Note that, the following embodiment is just an example for explaining the present invention and should not be construed as limiting the present invention to the following contents. The present invention can be appropriately modified and carried out within the scope of the invention.

The oxygen absorbing multilayer container of the present embodiment is an oxygen absorbing multilayer container having at least three layers of a first resin layer (layer B1) containing a thermoplastic resin (b), an oxygen absorbing layer (layer A) containing an oxygen absorbing resin composition which contains a polyester compound (a) containing a constituent unit having a tetralin ring and a transition metal catalyst, and a second resin layer (layer B2) containing the same type of thermoplastic resin (b) as the thermoplastic resin contained in the first resin layer, in this order, in which, a cycloolefin polymer having a glass transition temperature of 50 to 110° C. is contained as the thermoplastic resin (b). Hereinafter, the first resin layer (layer B1) and the second resin layer (layer B2) will be sometimes collectively referred to as "layer B".

The oxygen absorbing multilayer container of the present embodiment employs a cycloolefin polymer (COP) having a glass transition temperature of 50 to 110° C. as the thermoplastic resin (b). Owing to this, oxygen present in the container is adsorbed, and if oxygen permeates through the wall and enters from outside even in a small amount, such permeating or entering oxygen is also adsorbed, with the result that e.g. deterioration of a content (an article to be stored) stored in the container with oxygen can be prevented.

The constitution of layers of the oxygen absorbing multilayer container of the present embodiment is not particularly limited as long as the arrangement of the layers is B1/A/B2; more specifically, the number and types of oxygen absorbing layers (layer A) and resin layers (layer B (layer B1, B2)) are not particularly limited. For example, a five-layer structure having further two B layers and represented by B/B/A/B/B, i.e., a five-layer structure formed of three types of materials, may be employed. The oxygen absorbing multilayer container of the present embodiment may optionally contain an arbitrary layer such as an adhesion layer (layer AD), if necessary; for example, a seven-layer structure consisting of four types of materials and represented by B/AD/B/A/B/AD/B, may be employed.

[Oxygen Absorbing Layer (Layer A)]

The oxygen absorbing layer (layer A) of the present embodiment contains an oxygen absorbing resin composition which contains a polyester compound (a) having a tetralin ring as a constituent unit and a transition metal catalyst.

<Polyester Compound (a)>

The polyester compound (a) is not particularly limited as long as it is a polyester compound having a tetralin ring as a constituent unit; for example, a polyester compound described in e.g., Patent Literature 1, can be used. In view of molding processability and oxygen absorption performance, a polyester compound (a) containing at least one constituent unit having tetralin ring selected from the group consisting of the following formulas (i) to (iv) is preferable. In particular, the constituent unit represented by the general formula (i) is more preferably at least one selected from the group consisting of the following formulas (1) to (3). Of these, a polyester compound having a constituent unit represented by the following formula (1) is further preferable. Herein, "having as a constituent unit" means that one or more of the constituent units are contained in a compound. It is preferable that the constituent unit is contained as a repeating unit in a polyester compound (a). Likewise, if the polyester compound is a polymer, the polymer may be any one of a homopolymer of the above constituent unit, a random copolymer of the above constituent unit and another constituent unit and a block copolymer of the above constituent unit and another constituent unit.

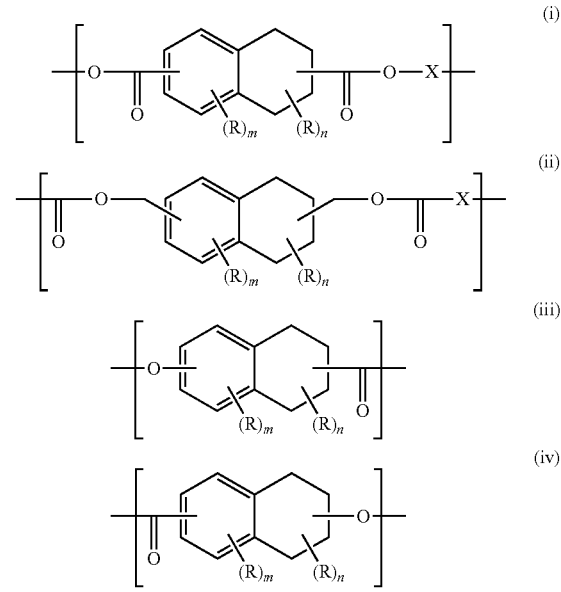

wherein, R each independently represents a hydrogen atom or a monovalent substituent; the monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group and an imide group, which may further have a substituent; m represents an integer of 0 to 3; n represents an integer of 0 to 7, and a hydrogen atom is bonded to at least one of the benzyl positions of the tetralin ring; and X represents a divalent group containing at least one group selected from the group consisting of an aromatic hydrocarbon group, a saturated or unsaturated alicyclic hydrocarbon group, a linear or branched and saturated or unsaturated aliphatic hydrocarbon group and a heterocyclic group.

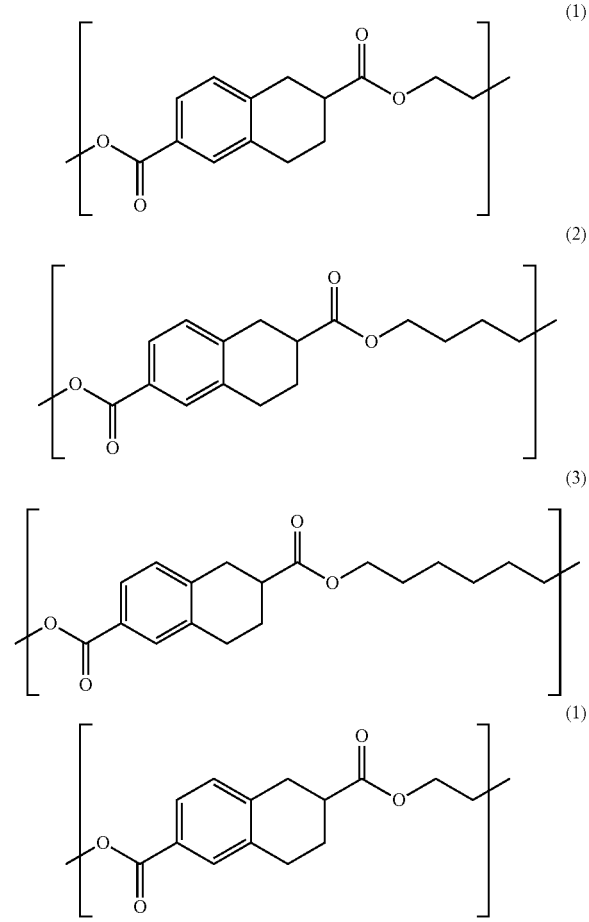

Further, in view of molding processability and oxygen absorption performance, the proportion of the constituent unit represented by the above formula (1) based on the all constituent units contained in the polyester compound (a), is preferably 50 to 100 mol %, more preferably 70 to 100 mol % and further preferably 90 to 100 mol %. If the proportion of the constituent unit represented by the formula (1) falls within the above range, the effect of the present embodiment is further improved and physical properties of the oxygen absorbing multilayer container such as impact resistance, molding processability, transparency and oxygen absorption performance can be maintained at high levels and in a balanced manner.

The polyester compound (a) can further contain a constituent unit derived from at least one polyfunctional compound selected from polyhydric alcohols of a trivalent or more, polycarboxylic acids of a trivalent or more and derivatives thereof, and hydroxycarboxylic acids of a trivalent or more and derivatives thereof. These polyfunctional compounds may be used singly or in combinations of two or more. In the case where a constituent unit derived from any one of these polyfunctional compounds is contained, a branched structure may be introduced in the polyester compound (a), with the result that a polyester compound (a) having a higher molecular weight than usual and improved in viscosity can be obtained. Examples of the polyfunctional compound include, but not limited to, polyhydric alcohols such as glycerin, trimethylol propane and pentaerythritol; and polyvalent carboxylic acids and derivatives thereof such as trimellitic acid, a trimellitic anhydride, pyromellitic acid and a pyromellitic anhydride. Of these, glycerin is preferable.

In the case where the polyester compound (a) contains a constituent unit derived from a polyfunctional compound, the proportion of the constituent unit derived from a polyfunctional compound based on the all constituent units contained in the polyester compound (a), is preferably 0.01 to 5 mol %, more preferably 0.1 to 3 mol % and further preferably 0.2 to 1 mol %.

The polyester compound (a) can be produced by a known method described in e.g., Patent Literature 1; for example, obtained by polycondensation between a monomer having a tetralin ring or a derivative thereof and a polyfunctional compound such as a diol or a derivative thereof. Further, into the polyester compound (a), a constituent unit having no tetralin ring may be introduced as a copolymer component as long as it does not affect the performance thereof. More specifically, a known compound described in Patent Literature 1 can be used as a copolymer component.

It is preferable that a polyester compound (a) has a hydrogen atom at least one of the benzyl positions of the tetralin ring. If a polyester compound having a hydrogen atom at a benzyl position of the tetralin ring is used in combination with a transition metal catalyst, the hydrogen at the benzyl position is removed. In this manner, it is considered to produce excellent oxygen absorption performance (however, the effect of the present embodiment is not limited to these).

According to the oxygen absorbing resin composition of the present embodiment, in a preferable aspect thereof, generation of a low molecular-weight compound after absorption of oxygen can be prevented. Although the reason is unknown, it is considered that the suppression is probably made by the following mechanism of the oxidation reaction: first, a hydrogen atom is removed from a benzyl position of the tetralin ring of a polyester compound (a) to produce a radical, which thereafter, reacts with oxygen to oxidize carbon at the benzyl position, with the result that a hydroxy group or a ketone group is produced. Owing to this, in the oxygen absorbing resin composition, no cleavage of a molecular chain by an oxidation reaction occurs and the structure of the polyester compound (a) is maintained. Because of this, after oxygen absorption, low molecular weight organic compounds, which are a cause of odor, are rarely produced. As a result, an increase in intensity of odor after oxygen absorption, is suppressed; at the same time, contamination of a content with low-molecular-weight compounds is presumably prevented (however, the effect of the present embodiment is not limited to these).

The glass transition temperature (Tg) of a polyester compound (a), is not particularly limited; however, in view of e.g., the molding processability of the oxygen absorbing multilayer container, Tg is preferably 50 to 110° C., more preferably 60 to 80° C., further preferably 60 to 75° C. and further more preferably 65 to 75° C. If the glass transition temperature falls within the above range, the molding processability of the oxygen absorbing multilayer container and oxygen absorption rate thereof are further improved. Note that, the glass transition temperature herein refers to a value obtained by differential scanning calorimetry performed in accordance with the method described in Examples (described later).

The intrinsic viscosity (a measurement value obtained at 25° C. by using a solvent mixture of phenol and 1,1,2,2-tetrachloroethane in a mass ratio of 6:4) of a polyester compound (a) is not particularly limited; however, in view of the molding processability of the oxygen absorbing multilayer container, the intrinsic viscosity is preferably 0.1 to 2.0 dL/g, more preferably 0.5 to 1.5 dL/g and further preferably 0.8 to 1.0 dL/g.

The melt viscosity of a polyester compound (a) is not particularly limited; however, in view of the molding processability of the oxygen absorbing multilayer container, the melt viscosity at a shear rate of 1216 sec$^{-1}$ and 260° C. is preferably 100 to 300 Pa·sec and more preferably 150 to 250 Pa·sec. If the melt viscosity falls within the above range, the molding processability of the oxygen absorbing multilayer container is further improved.

<Transition Metal Catalyst>

The transition metal catalyst to be used in the oxygen absorbing resin composition is not particularly limited as long as it can serve as a catalyst for the oxidation reaction of a polyester compound (a), and can be appropriately selected from known catalysts.

Specific examples of the transition metal catalyst include organic acids, halides, phosphates, phosphites, hypophosphites, nitrates, sulfates, oxides and hydroxides of transition metals. Examples of the transition metal to be contained in the transition metal catalyst include, but are not limited to, titanium, vanadium, chromium, manganese, iron, cobalt, nickel, copper, zinc, ruthenium and rhodium. Of these, manganese, iron, cobalt, nickel and copper are preferable. Examples of the organic acids include, but are not limited to, acetic acid, propionic acid, octanoic acid, lauric acid, stearic acid, acetylacetone, dimethyldithiocarbamic acid, palmitic acid, 2-ethylhexanoic acid, neodecanoic acid, linoleic acid, tall acid, oleic acid, capric acid and naphthenic acid. As the transition metal catalyst, a combination of one of these transition metals and an organic acid is preferable; and a combination of a transition metal, such as manganese, iron, cobalt, nickel or copper, and an organic acid, such as acetic acid, stearic acid, 2-ethylhexanoic acid, oleic acid or naphthenic acid, is more preferable. Note that, the transition metal catalysts may be used singly or in combinations of two or more.

The content of the transition metal catalyst can be appropriately determined according to the types of polyester compound (a) and transition metal catalyst to be used and the desired performance thereof, and is not particularly limited. In view of the oxygen absorption performance of an oxygen absorbing resin composition, the content of the transition metal catalyst based on 100 parts by mass of a polyester compound (a) is preferably 0.001 to 10 parts by mass, more preferably 0.002 to 2 parts by mass and further preferably, 0.005 to 1 part by mass, in terms of the amount of transition metal.

A polyester compound (a) and a transition metal catalyst can be mixed by a known method; however, they are preferably kneaded by an extruder. If an extruder is used, an oxygen absorbing resin composition having further satisfactory dispersibility can be obtained. To the oxygen absorbing resin composition, as long as the effect of the present embodiment is not excessively impaired, additives such as a drying agent, a pigment, a dye, an antioxidant, a slip agent, an antistatic agent and a stabilizer; fillers such as calcium carbonate, clay, mica and silica; and a deodorant, may be added. The materials to be added are not limited to those mentioned above and various materials can be mixed.

Note that, the oxygen absorbing resin composition of the present embodiment may further contain a radical-generating agent and a photo initiator, if necessary, in order to accelerate an oxygen absorption reaction. The oxygen absorbing resin composition of the present embodiment may be kneaded with another thermoplastic resin by an extruder as long as achievement of the object of the present embodiment is not inhibited. As the radical-generating agent, photo initiator and another thermoplastic resin, those known in the art and described in Patent Literature 1 can be used.

The content of the thermoplastic resin (a) in layer A is preferably 50 mass % or more, more preferably 70 mass % or more and further preferably 90 mass % or more. If the content of the thermoplastic resin (a) falls within the above range, the oxygen absorption performance can be more improved compared to the case where the content is less than 50 mass %.

The thickness of the oxygen absorbing layer (layer A) is not particularly limited; however the thickness of layer A is preferably 1 to 1000 m, more preferably 20 to 800 m and further preferably 50 to 700 rm. If the thickness of layer A falls within the above range, the oxygen absorption performance can be further improved without impairing economic efficiency.

[Resin Layer (Layer B (Layer B1, B2)) Containing Thermoplastic Resin (b)]

Layer B of the present embodiment is a resin layer containing a thermoplastic resin (b). The content rate of the thermoplastic resin (b) in layer B is not particularly limited; however, the content rate is preferably 70 to 100 mass %, more preferably 80 to 100 mass % and further preferably 90 to 100 mass %.

The oxygen absorbing multilayer container of the present embodiment has at least two B layers and may have three B layers or more. The structures of a plurality of B layers may be the same or different. In view of simplicity in producing and performance of the oxygen absorbing multilayer container, it is preferable that layer B1 and layer B2 have the same component compositions. The thickness of layer B can be appropriately determined depending upon the use. In order to ensure physical properties required for a multilayer container, including strength such as falling resistance, and flexibility, the thickness is preferably 5 to 1000 μm, more preferably 50 to 800 μm and further preferably 100 to 500 μm. In view of simplicity in producing and performance of the oxygen absorbing multilayer container, it is preferable that layer B1 and layer B2 preferably have same thickness.

<Thermoplastic Resin (b)>

The thermoplastic resin (b) contains a cycloolefin polymer (COP) having a glass transition temperature of 50 to 110° C. COP is a polymer using a norbornene-based monomer at least as a monomer and obtained by ring-opening polymerization followed by hydrogenation. COP has an alicyclic structure in a molecule (structure) and is amorphous. Examples of the norbornene-based monomer include 2-norbornene and/or a 2-norbornene compound having a substituent. Examples of the 2-norbornene compound having a substituent include 2-norbornenes having an alkyl group, an alkylidene group and an aromatic group as a substituent; and 2-norbornenes having these substituents which have a halogen, a hydroxyl group, an ester group, an alkoxy group, a cyano group, an amide group, an imide group and a silyl group. Specific examples thereof include 2-norbornene, 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene, 5-hexyl-2-norbornene, 5-octyl-2-norbornene and 5-octadecyl-2-norbornene.

COP may be a copolymer obtained by polymerization of a norbornene-based monomer in combination with another monomer copolymerizable with the norbornene-based monomer. For example, COP can be obtained by ring-opening polymerization of a norbornene-based monomer and another cycloolefin used at least as monomers. Examples of another cycloolefin include cyclopentene, cyclooctene, dicyclopentadiene, methyldicyclopentadiene, dimethyldicyclopentadiene and 5,6-dihydrodicyclopentadiene.

In polymerization, a transition metal compound such as $TiCl_4$, $WCl_6$, $MoCl_5$, $VCl_5$, $NiCl_2$ and $PdCl_2$ and an alkyl compound of a metal (typical metal) such as Al, Li, Na and Mg are used in combination as a polymerization catalyst. If necessary, hydrogenation may be carried out by a known method using a metal such as Ni or Pd as a catalyst.

As the COP, a known COP can be used, for example, COP described in e.g., Japanese Patent Laid-Open No. 5-317411 can be mentioned. Furthermore, a commercially available COP can be used. The commercially available COP can be appropriately selected from grades such as "ZEONEX" (trade mark) and "ZEONOR" (trade mark), manufactured by ZEON CORPORATION and "Daikyo Resin CZ" (trade mark) manufactured by Daikyo Seiko, Ltd. COP has an advantage in that chemical properties thereof such as heat resistance and light resistance and chemical resistance are analogous to those of polyolefin resins; whereas physical properties thereof such as mechanical properties, melt properties, flow properties and dimensional accuracy are those exhibited by amorphous resins. Examples of the COP having a glass transition temperature of 50 to 110° C. include trade name: "ZEONEX 5000" (glass transition temperature: 68° C., melt viscosity at a shear rate of 1216 $sec^{-1}$ and 260° C. is 194 Pa·sec) manufactured by ZEON CORPORATION, is mentioned.

The glass transition temperature (Tg) of a thermoplastic resin (b) is 0 to 110° C., more preferably 60 to 80° C. and further preferably 60 to 75° C. If the glass transition temperature falls within the above range, the molding processability of the oxygen absorbing multilayer container is further improved. Note that, the glass transition temperature herein refers to a value obtained by differential scanning calorimetry in accordance with the method described in Examples (described later). Note that, the glass transition temperature (Tg) of COP tends to decrease as the content of a norbornene-based monomer increases. In contrast, Tg tends to increase as the content of a cycloolefin such as dicyclopentadiene and the content of a polycyclic norbornene-based monomer having three or more rings increases. Furthermore, Tg tends to increase as the content of ring structures increases. If the structure of COP is appropriately controlled in consideration of these, Tg can be efficiently controlled.

The absolute value of difference in glass transition temperature (Tg) between a thermoplastic resin (b) and a polyester compound (a) is preferably 0 to 40° C. and more preferably 0 to 20° C. As the absolute value of difference in glass transition temperature (Tg) decreases, the molding processability of the oxygen absorbing multilayer container is further improved.

The melt viscosity of a thermoplastic resin (b) is not particularly limited; however, in view of the molding processability of the oxygen absorbing multilayer container, the melt viscosity at a shear rate of 1216 $sec^{-1}$ and 260° C. is preferably 100 to 300 Pa·sec and more preferably 150 to 250 Pa·sec. If the melt viscosity falls within the above range, the molding processability of the oxygen absorbing multilayer container is further improved.

The absolute value of difference in melt viscosity at a shear rate of 1216 $sec^{-1}$ and 260° C. between a thermoplastic resin (b) and a polyester compound (a) is preferably 0 to 150 Pa·sec and more preferably 0 to 100 Pa·sec. As the absolute value of difference in melt viscosity at a shear rate of 1216 $sec^{-1}$ and 260° C. decreases, the molding processability of the oxygen absorbing multilayer container is (further) improved.

Layer B may further contain a thermoplastic resin other than COP and known additives as long as the effect of the present embodiment is not excessively impaired. The content of the COP based on the total amount of the thermoplastic resin composition constituting layer B, which is not particularly limited, is preferably 50 to 100 mass %, and in view of transparency, more preferably 70 to 100 mass % and further preferably 90 to 100 mass %.

The oxygen absorbing multilayer container of the present embodiment may have an optional layer in accordance with e.g., desired performance, in addition to an oxygen absorbing layer (layer A) and a layer containing a thermoplastic resin (b) (layer B (layer B1, layer B2)). Examples of such optional layer include an adhesion layer.

In the oxygen absorbing multilayer container of the present embodiment, when practical interlayer adhesive strength is not obtained between adjacent two layers, an adhesion layer (layer AD) is preferably provided between the two layers. The adhesion layer preferably contains a thermoplastic resin having adhesiveness. Examples of the thermoplastic resin having adhesiveness include acid-modified polyolefin resins, which are each obtained by modifying a polyolefin resin (e.g., polyethylene or polypropylene) with an unsaturated carboxylic acid (e.g., acrylic acid, methacrylic acid, maleic acid, maleic anhydride, fumaric acid, itaconic acid); and polyester thermoplastic elastomers containing a polyester block copolymer as a main component. In the adhesion layer, in view of adhesiveness, a modified resin obtained by modifying the same type of thermoplastic resin used as layer B is preferably used. The thickness of the adhesion layer is preferably 2 to 100 µm, more preferably 5 to 90 µm and further preferably 0 to 80 µm in order to exhibit practical adhesive strength simultaneously with maintaining excellent molding processability.

<Method for Producing Oxygen Absorbing Multilayer Container>

A method for producing an oxygen absorbing multilayer container of the present embodiment is not particularly limited, the oxygen absorbing multilayer is preferably produced by an injection molding method. Further preferably, the method contains a step of forming multilayer container by injecting at least three layers of a first layer (layer B1), an oxygen absorbing layer (layer A) and a second layer (layer B2), from an injection cylinder and, in this step, the absolute value of difference between the injection cylinder temperature for the first layer (layer B1) and the injection cylinder temperature for the oxygen absorbing layer (layer A) is 0 to 30° C. For example, for producing a multilayer container of a three-layer (B/A/B) structure, there is a method in which a material for constituting layer A and a material for constituting layer B are injected from respective injection cylinders through a mold hot runner into a cavity by use of a molding apparatus having two or more injection machines and injection molds. Owing to the method, a multilayer container can be produced in accordance with the shape of the injection mold. This method is particularly preferable in the case where the component compositions of individual layers B (e.g., layer B1, layer B2) are identical.

For producing a multilayer container of a five-layer (B/A/B/A/B) structure, there is a method in which a material for constituting layer B from an injection cylinder is first injected, subsequently a material for constituting layer A alone is injected from an injection cylinder and finally injecting a material for constituting another layer B from an injection cylinder. By filling a cavity with these, a multilayer container consisting of the five-layer (B/A/B/A/B) structure can also be produced. This method is particularly preferable in the case where the component compositions of individual layer B (e.g., layer B1, layer B2) are identical.

For producing a multilayer container of a five-layer (B/A/B/A/B) structure, there is another method in which a material for constituting layer B is first injected from an injection cylinder; subsequently a material for constituting layer A is injected from another injection cylinder simultaneously with a resin for constituting another B layer from another injection cylinder. By filling a cavity with these, a multilayer container consisting of a five-layer (B/A/B/A/B) structure can also be produced. This method is particularly preferable in the case where the component compositions of individual layer B (e.g., layer B1, layer B2) are identical.

In view of molding processability, the absolute value of difference in injection temperature between a material for constituting layer B and a material for constituting layer A is preferably 0 to 30° C., more preferably 0 to 20° C. and further more preferably 0 to 10° C. The injection temperature herein refers to the temperature of a material passing through an injection cylinder. In view of molding processability, the absolute value of difference in melt viscosity at the injection temperature between individual layers is preferably 0 to 150 Pa·sec and more preferably 0 to 100 Pa·sec. The melt viscosity of each layer refers to the melt viscosity of a material passing through an injection cylinder at the injection temperature.

As a method for producing the oxygen absorbing multilayer container of the present embodiment, an injection molding method is usually preferable; however, e.g., a compression molding method may be employed for obtaining a multilayer body. For example, an oxygen absorbing resin agent is provided in a thermoplastic resin melt and the resultant molten mass is supplied to a male die and simultaneously compressed by a female die, and a compression molding is cooled and solidified to obtain a multilayer body. Furthermore, a multilayer body may be molded into a desired container shape by a molding means such as extrusion molding and compression molding (sheet molding, blow molding).

[Oxygen Absorbing Multilayer Container]

The shape, size and others of the oxygen absorbing multilayer container of the present embodiment are not particularly limited and appropriately selected depending upon the article to be stored and preserved. Preferable examples of such a container include a pouch, a cup, a tray, a bottle, a vial, an ampule, a prefilled syringe and a vacuum blood collection tube.

Further, if a sheet-form (sometimes called as "film-form") oxygen absorbing multi-layer laminate is subjected to a bag-making, e.g., a three sided seal sack, a standing pouch, a gussetted packaging bag, a pillow packaging bag, a multi-chamber pouch consisting of a main chamber and a sub chamber with an easy-to-peel wall interposed between the chambers and a shrink film packaging can be obtained. Furthermore, if thermoforming is applied, containers having arbitrary shapes can be obtained.

More specifically, the above oxygen absorbing multilayer laminate sheet is molded by a method such as vacuum molding, air-pressure forming and plug assist molding to manufacture an oxygen absorbing multilayer container having a predetermined shape such as a tray, a cup, a bottle, a tube and a PTP (press-through package). Furthermore, multilayer containers having predetermined shape can be molded at a time by co-injecting or subsequently injecting a molten resin into an injection mold through multi-layer multiple-dies by use of an injection machine.

Note that, when an oxygen absorbing multilayer container having a flange portion is produced, a special treatment for imparting an easy-to-peel function may be applied to the flange portion. Furthermore, if the above oxygen absorbing multi-layer laminate is used as a member such as a container lid and a top seal, containers having an oxygen absorption function can be provided.

When the oxygen absorbing multilayer container of the present embodiment is used, starting of an oxygen absorption reaction can be facilitated and the oxygen absorption rate can be enhanced by irradiation of an energy line. Examples of the energy line that can be used include visible light beams, ultraviolet rays, X-rays, electron beams and gamma rays. The irradiation amount of energy can be appropriately selected depending upon the type of energy line.

The oxygen absorbing multilayer container of the present embodiment requires no moisture for absorbing oxygen. Because of this, the oxygen absorbing multilayer container of the present embodiment has the advantage that not only excellent oxygen absorption performance in a wide range of humidity conditions from low humidity to high humidity (relative humidity 0% to 100%) but also excellent quality retention of a content can be provided. For the reason, the oxygen absorbing multilayer container is suitable for storing and containing various specific articles. For example, medicinal products are suitably stored and contained. More specifically, vitamin preparations such as vitamin A, vitamin B2, vitamin B12, vitamin C, vitamin D, vitamin E and vitamin K; alkaloids such as atropine; hormone agents such as adrenaline and insulin; sugars such as glucose and maltose; antibiotics such as ceftriaxone, cephalosporins and cyclosporine; and benzodiazepine medicinal agents such as oxazolam, flunitrazepam, clotiazepam and clobazam can be packed regardless of natural or synthetic compound. If these natural and synthetic compounds are packed in the oxygen absorbing multilayer container of the present embodiment, the amount of these natural and synthetic compounds adsorbed is low and deterioration of these compounds due to oxidation can be suppressed, and further, evaporation of a solvent (for example, moisture) can be suppressed. Specific examples of the content except medicinal products include, but are not particularly limited to, beverages such as milk, juice, coffee, tea and alcohol beverage; liquid seasonings such as sauce, soy sauce and dressing; cooked foods such as soup, stew and curry; paste foods such as jam and mayonnaise; fishery products such as tuna and seafood; dairy products such as cheese and butter; meat processed products such as meat, salami, sausage and ham; vegetables such as carrot and potato; eggs; noodles; rice uncooked; processed rice products such as cooked rice and rice gruel; dry foods such as powder seasoning, coffee powder, milk powder for infants, cooked food for infants, powder diet food, nursing care cooked food, dry vegetables and rice crackers; chemicals such as a pesticide and an insecticide; cosmetics; pet foods; and commodities such as a detergent.

[Sterilization Treatment]

Note that, before and after these contents are packed (packaged), containers and contents can be sterilized in appropriate ways suitable for the contents. Examples of sterilization methods include, heat sterilization such as a treatment with hot water of 100° C. or less, a treatment with pressurized hot water of 100° C. or more and heating to an extremely high temperature of 130° C. or more; sterilization with electromagnetic wave such as ultraviolet, microwave and gamma-ray; treatment with gas such as ethylene oxide; and sterilization with a chemical agent such as hydrogen peroxide and hypochlorous acid.

EXAMPLES

Now, the present invention will be more specifically described by way of Examples and Comparative Examples; however, the present invention is not limited by these. Note that, unless otherwise specified, NMR measurement was carried out by use of "AVANCE III-500" manufactured by BRUKER at room temperature. Note that, in the following Examples, vials are described as an example; however, since properties required for ampules and prefilled syringe are the same as those required for vials, the present invention with respect to this point is not limited by these Examples.

Various property values of the compounds and others obtained in Production Example (described later) were measured by the following measurement methods and measurement devices.

(Method for Measuring Glass Transition Temperature)

Glass transition temperature was measured in accordance with JIS K7122. As a measurement device, a differential scanning calorimeter (DSC; "DSC-60", manufactured by Shimadzu Corporation) was used. Note that, measurement conditions of DSC were as follows.

Measurement device: "DSC-60", manufactured by Shimadzu Corporation,
Starting temperature of measurement: 25° C.
Temperature raising rate: 10° C./minute
Achieving temperature: 220° C.
Temperature decreasing rate: 5° C./minute (Method for Measuring Melt Viscosity)

Melt viscosity was measured by use of a capillary rheometer "CAPILOGRAPH 1D", manufactured by TOYO SEIKI SEISAKU-SHO, LTD., at a temperature of 260° C. and a shear rate of 1216 sec$^{-1}$.

[Monomer Synthesis Example]

To an autoclave having an inner volume of 18 L, dimethyl naphthalene-2,6-dicarboxylate (2.20 kg), 2-propanol (11.0 kg) and a catalyst (350 g (containing 50 wt % of water)) consisting of active carbon carrying 5% palladium were placed. Then, the air of the autoclave was replaced with nitrogen and the nitrogen was further replaced with hydrogen. Thereafter, hydrogen was supplied until the interior pressure of the autoclave reached 0.8 MPa. Next, a stirrer was driven and the rotational speed thereof was adjusted to 500 rpm. The interior temperature was raised up to 100° C. over 30 minutes, further hydrogen was supplied to adjust the pressure to 1 MPa. Thereafter, supply of hydrogen was continued so as to maintain 1 MPa in response to a pressure drop with the progress of the reaction. Since no pressure drop was observed seven hours later, the autoclave was cooled and unreacted residual hydrogen was released. Thereafter a reaction solution was taken out from the autoclave. After the reaction solution was filtered to remove the catalyst, 2-propanol was vaporized from the filtrate separated by an evaporator. To the resultant crude product, 2-propanol (4.40 kg) was added and purification was performed by recrystallization to obtain tetralin-2,6-dicarboxylic acid dimethyl in a yield of 80% (yield based on naphthalene-2,6-dicarboxylic acid dimethyl). Note that, the analysis results of NMR were as follows.

$^1$H-NMR (400 MHz CDCl$_3$) δ 7.76-7.96 (2H m), 7.15 (1H d), 3.89 (3H s), 3.70 (3H s), 2.70-3.09 (5H m), 1.80-1.95 (1H m).

<Production Example of Polymer>

Production Example 1

A polyester resin producing apparatus equipped with a packed tower rectifying column, a partial condenser, a total condenser, a cold trap, a stirrer, a heating device and a nitrogen inlet tube was charged with dimethyl tetralin-2,6-dicarboxylate (543 g) obtained in Monomer Synthesis Example, ethylene glycol (217 g), glycerin (1.0 g) as a polyfunctional compound, tetrabutyl titanate (0.038 g) and zinc acetate (0.15 g). The temperature of the reaction system was increased to 230° C. under a nitrogen atmosphere and a transesterification reaction was carried out. After the reaction conversion rate of a dicarboxylic acid component reached 90% or more, temperature was increased and pressure was reduced gradually over 90 minutes. Polycondensation was performed for one hour at 260° C. and 133 Pa or less to obtain a polyester compound (1) having a repeating structure represented by the following formula (1).

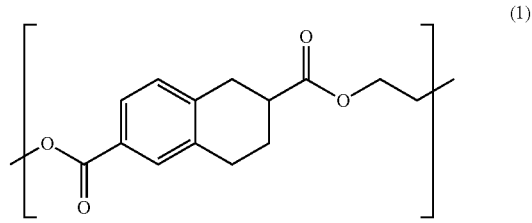

(1)

The glass transition temperature and melting point of the polyester compound (1) obtained were measured by a differential scanning calorimeter (DSC). As a result, the glass transition temperature of the polyester compound (1) was determined to be 69° C.; whereas the melting point was not determined because of an amorphous structure. Furthermore, the melt viscosity of the polyester compound (1) was measured by use of a capillary rheometer ("Capirograph 1D", manufactured by TOYO SEIKI SEISAKU-SHO, LTD.). The physical properties of the polyester compound (1) are shown in Table 1.

TABLE 1

| | Name of resin | Glass transition temperature (° C.) | Melt viscosity[1] (Pa · sec) |
|---|---|---|---|
| Production Example 1 | Polyester compound (1) | 69 | 164 |

[1]Melt viscosity at a shear rate of 1216 sec$^{-1}$ and 260° C.

<Production of Vial>

In the following conditions, a material for constituting layer B was injected from an injection cylinder and subsequently a material for constituting layer A was injected from another injection cylinder simultaneously with a resin for constituting layer B, and then, the cavity in an injection mold was filled with a resin for constituting layer B by injecting the resin in a required amount to obtain an injection molded article of a three (B/A/B) layer structure. The injection molded article obtained was cooled to a predetermined temperature, transferred to a blow mold and subjected to blow molding to obtain vials (bottle portions). This cycle of process (one cycle takes 15 minutes) was continuously repeated for 3 hours (continuous molding for 3 hours).

Total mass of vial: 5 g

Mass of layer A: 30 mass % based on the total mass of vial

<Shape of Vial>

The shape of the vials was specified by a height of 45 mm, an outer diameter of 24 mmφ and a wall thickness of 1 mm. Note that, the vials were produced by using a one-step injection stretch blow machine (mode "ASB12N-10T", proving 4 vials, manufactured by NISSEI ASB MACHINE CO., LTD.).

<Evaluation of Vial>

The molding processability, drop test, oxygen permeability and transparency of the vials obtained in Examples and Comparative Examples were evaluated by the following methods.

Molding Processability

Molding processability of vials (bottle portion) obtained in the above "<Production of vial>" was evaluated based on e.g., appearance of the three layer structure of the vials (bottle portion). More specifically, molding processability was evaluated based on the following criteria.

(a) the presence or absence of lambency in appearance due to non-smoothness and disturbance at the interface between layer A and layer B (layer B1, layer B2) was determined by visual inspection (presence or absence of "disturbance"). Then, the ratio of number of vials determined as having no disturbance based on the total number of vials obtained by continuous molding for 3 hours, was obtained. The ratio was specified as an "acquisition rate" (number of vials having no disturbance/total number of vials).

(b) the presence or absence of irregularity, which was derived from deposition of e.g. a resin component onto the bottoms of the vials obtained (corresponding to the gate portion when vials were injected from a mold), was determined (presence or absence of "irregularity").

A: Acquisition rate 90% or more, no irregularity

B: Acquisition rate 90% or more, irregularity is present

C: Acquisition rate 50% or more and less than 90%, no irregularity

D: Acquisition rate 50% or more and less than 90%, irregularity is present

E: Acquisition rate of less than 50%, no irregularity

F: Acquisition rate of less than 50%, irregularity is present

Impact Resistance Test (Drop Test)

A vial was filled with pure water (10 mL) and hermetically sealed with a rubber stopper and an aluminum cap. This container was dropped from a height of 1.5 m and the presence or absence of breakage of the vial was checked. When the container was broken, if water packed in the container was scattered from a broken site, the container was determined as having a defect. Twenty samples were checked. Note that the landing area had a smooth surface made of a stainless steel and vials were dropped such that the bottoms of vials came into contact with the surface of the landing area.

Oxygen Permeability (OTR)

The atmosphere outside a vial was controlled to have a relative humidity of 50% and the interior atmosphere of the vial was controlled to have a relative humidity of 100%, at 23° C. An oxygen permeability was measured on the 30th day after initiation of measurement. The measurement was performed by using an oxygen permeability measurement device (trade name, "OX-TRAN 2-21 ML", manufactured by MOCON). The lower the measured value, the more satisfactory the oxygen barrier property was. Note that, the lower detection limit of oxygen permeability in measurement was $5 \times 10^{-5}$ mL/(0.21 atm·day·package)

Transparency

The transparency (haze value) of a vial was measured by a haze meter ("color difference-turbidity measuring instrument COH-400", manufactured by Nippon Denshoku Industries Co., Ltd.) in accordance with JIS K7136. Note that, the transparency of a site on the side surface of a vial at a distance of 15 mm from the bottom portion of a vial was measured.

Example 1

Cobalt stearate (II) was dry-blended such that the amount of cobalt based on 100 parts by mass of the polyester compound (1) became 0.02 parts by mass to obtain an oxygen absorbing resin composition. The oxygen absorbing resin composition was used as a resin for constituting layer A and a cycloolefin polymer 1 (trade name "ZEONEX 5000", manufactured by ZEON CORPORATION, glass transition temperature: 68° C., melt viscosity at a shear rate of 1216 $sec^{-1}$ and 260° C.: 194 Pa·sec) was used as layer B. Vials were produced in the molding conditions shown below and evaluated. Note that, no resin deposition onto the mold was observed at the time of injection molding of the vials and the evaluation result of the above described "molding processability" was "A". The producing condition and physical properties of Example 1 are shown in Table 2.

(Molding Conditions for Vial)

Temperature of injection cylinder for layer A: 260° C.

Temperature of injection cylinder for layer B: 260° C.

Temperature of resin flow channel in injection mold: 260° C.

Temperature of injection mold: 50° C.

Temperature of cooling water for blow mold: 30° C.

Cycle time: 15 seconds

Comparative Example 1

Vials were produced in the same manner as in Example 1 except that cycloolefin polymer 2 (trade name, "ZEONEX 690R", produced by ZEON CORPORATION, glass transition temperature: 136° C., melt viscosity at a shear rate of 1216 $sec^{-1}$ and 260° C.: 362 Pa·sec) was used for layer B and that the following molding conditions were employed, and subjected to evaluation. Note that, within 30 minutes after continuous injection molding of vials was started, resin deposition onto the mold was observed. Once the resin was deposited onto a mold during the continuous molding process, irregularity on the bottom portions of vials produced thereafter was continuously observed. The evaluation result of the above described "molding processability" was "F". The producing conditions and physical properties of Comparative Example 1 are shown in Table 2.

(Molding Conditions for Vial)

Temperature of injection cylinder for layer A: 260° C.

Temperature of injection cylinder for layer B: 300° C.

Temperature of resin flow channel in injection mold: 300° C.

Temperature of injection mold: 90° C.

Temperature of cooling water for blow mold: 30° C.

Cycle time: 15 seconds

TABLE 2

| | Resin used for Layer A | Type of resin (trade name) | Resin used for Layer B Glass transition temperature (° C.) | Melt viscosity[1] (Pa·sec) | Molding processability | Drop test | Transparency (haze) (%) | Oxygen permeability[2] |
|---|---|---|---|---|---|---|---|---|
| Example 1 | Polyester Compound (1) | COP1 (ZEONEX5000) | 68 | 194 | A | No breakage | 10.8 | Detection limit or less |
| Comparative Example 1 | | COP2 (ZEONEX690R) | 136 | 362 | F | 15 out of 20 were broken | 11.1 | Detection limit or less |

[1] Melt viscosity at a shear rate of 1216 sec$^{-1}$ and 260° C.
[2] Unit: mL/(0.21 atm · day · package), detection lower limit: 5 × 10$^{-5}$ mL/(0.21 atm · day · package)

As is apparent from Table 2, it was confirmed at least that Example 1 has a satisfactory oxygen barrier property and excellent molding processability, impact resistance and transparency.

The present application claims a priority based on Japanese Patent Application No. 2014-062918 filed on Mar. 26, 2014 with the Japan Patent Office, the contents of which are incorporated herein by reference.

INDUSTRIAL APPLICABILITY

The oxygen absorbing multilayer container according to the present invention can be widely used and examples thereof include containers for storing various products such as foods, beverages, medicinal products and cosmetics.

The invention claimed is:

1. An oxygen absorbing multilayer container comprising, in the following order:
   a first resin layer comprising a cycloolefin polymer having a glass transition temperature of 50 to 110° C.;
   an oxygen absorbing layer comprising an oxygen absorbing resin composition which comprises a polyester compound (a) comprising the following formula (1) as a constituent unit

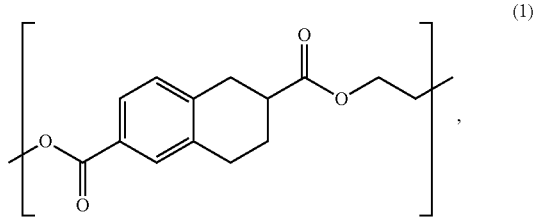
(1)

and a transition metal catalyst; and
   a second resin layer comprising a cycloolefin polymer having a glass transition temperature of 50 to 110° C.

2. The oxygen absorbing multilayer container according to claim 1, wherein a melt viscosity of the thermoplastic resin at a shear rate of 1216 sec$^{-1}$ and 260° C. is 100 to 300 Pa·sec.

3. The oxygen absorbing multilayer container according to claim 1, wherein an absolute value of difference in the melt viscosity at a shear rate of 1216 sec$^{-1}$ and 260° C. between the thermoplastic resin and the polyester compound (a) is 0 to 150 Pa·sec.

4. The oxygen absorbing multilayer container according to claim 1, wherein a proportion of the constituent unit represented by the formula (1) based on all constituent units in the polyester compound (a) is 50 to 100 mol %.

5. The oxygen absorbing multilayer container according to claim 1, wherein the transition metal catalyst comprises at least one transition metal selected from the group consisting of manganese, iron, cobalt, nickel and copper.

6. The oxygen absorbing multilayer container according to claim 1, wherein an amount of the transition metal catalyst in terms of an amount of transition metal is 0.001 to 10 parts by mass based on 100 parts by mass of the polyester compound.

7. A method for producing the oxygen absorbing multilayer container according to claim 1, comprising
   forming a multilayer container by injecting at least three layers of the first layer, the oxygen absorbing layer, and the second layer from an injection cylinder,
   wherein, an absolute value of difference between an injection cylinder temperature for the first layer and an injection cylinder temperature for the oxygen absorbing layer is 0 to 30° C.

* * * * *